United States Patent [19]
Tai

[11] Patent Number: 5,587,853
[45] Date of Patent: Dec. 24, 1996

[54] MANUALLY OPERATED VIDEO CASSETTE ADAPTER

[76] Inventor: David Tai, 1st. Fl., No. 17, Lane 180, Ho-Chiang Street, Taipei, Taiwan

[21] Appl. No.: 512,693

[22] Filed: Aug. 8, 1995

[51] Int. Cl.$^6$ ............................................... G11B 23/04
[52] U.S. Cl. ............................................................ 360/94
[58] Field of Search .............................. 360/94, 95, 96.5, 360/137; 242/336

[56] References Cited

U.S. PATENT DOCUMENTS

| | | | |
|---|---|---|---|
| 4,554,603 | 11/1985 | Tsuchiya | 360/94 |
| 4,622,605 | 11/1986 | Tsuruoka et al. | 360/94 |
| 5,333,078 | 7/1994 | Chen | 360/94 |
| 5,365,387 | 11/1994 | Chen | 360/94 |
| 5,504,634 | 4/1996 | Chen | 360/94 |

FOREIGN PATENT DOCUMENTS

| | | | |
|---|---|---|---|
| 58-57682 | 4/1983 | Japan | 360/94 |
| 58-211374 | 12/1983 | Japan | 360/94 |
| 58-212677 | 12/1983 | Japan | 360/94 |
| 58-212679 | 12/1983 | Japan | 360/94 |

Primary Examiner—Jefferson Evans
Attorney, Agent, or Firm—Morton J. Rosenberg; David I. Klein

[57] ABSTRACT

A video cassette adapter including: a housing having a receptacle for receiving a VHS-C video cassette; a first and a second tape conducting members pivotally disposed in two lateral sections of the housing for drawing the tape of the video cassette outward to an opening of a front section of the housing: a tape rolling reel disposed in the housing; a gear set operatively connected with the tape rolling reel; an operation button slidably disposed on and extended into the housing; a driving lever operatively connected with the first tape conducting member and the gear set; a damper mechanism disposed between the gear set and the driving lever; a transmission mechanism for driving the second tape conducting member; a linkage lever disposed between the first tape conducting member and the transmission mechanism; and a spring connected between the housing and the driving lever to help in retrieving the tape. By means of simple operation, the tape can be drawn to the operation position while keeping the tape properly tensioned. In addition, after retrieved, the tape is fully taken up without slack to avoid tangle and damage of the tape.

11 Claims, 5 Drawing Sheets

MANUALLY OPERATED VIDEO CASSETTE ADAPTER

BACKGROUND OF THE INVENTION

1. Fielf of the Invention

The present invention relates to a video cassette adapter, and more particularly to a manually operated video cassette adapter which is able to accommodate a VHS-C type video cassette and be inserted into a video cassette recorder for playing or recording the video cassette.

2. Description of Prior Art

Nowadays, the VHS video cassette is the most popular picture recording medium and the VHS video cassette recorder is widely used for playing or recording the VHS video cassette. The VHS video cassette has a considerably large dimension of 188 mm*104 mm*25 mm. A camera designed for such large a video cassette will consequently have large volume and heavy weight and can be hardly carried for shooting outdoors. Therefore, a VHS-C type video cassette (compact VHS video cassette) has been developed with a minimized dimension of 92 mm*59 mm*22 mm. Such a VHS-C video cassette is used with a corresponding minimized VHS-C camera which can be more easily carried. Such a VHS-C video cassette has a further advantage that the width of the tape installed therein is equal to the width of the tape in the VHS video cassette. Still more, the specification of the signal recorded in the VHS-C video cassette via a VHS-C camera is identical to that of the VHS video cassette. This permits the VHS-C video cassette to be first placed into a video cassette adapter which enlarges the size of the VHS-C video cassette into a VHS pattern and then inserted into a VHS video cassette recorder for playing.

The length of the VHS-C video cassette is 92 mm, while that of the video cassette adapter is 188 mm as the VHS video cassette. Therefore, after the VHS-C video cassette is placed into the adapter, the tape exposed at the opening of the VHS-C video cassette must be stretched to a length as that of the exposed tape of the VHS video cassette prior to the operation of the VHS video cassette recorder. The adapter includes two rotatable tape conducting members for conducting and drawing the tape in the VHS-C video cassette outward to an operation position at the opening of the adapter, ready for the operation of the recorder. A conventional manually operated video cassette adapter often fails to completely take up the tape and tends to damage the tape due to slack thereof.

Therefore, it is necessary to provide an improved video cassette adapter to solve the above problem. The improved video cassette adapter can be easily operated to draw the tape to the operation position with the tape properly tensioned. In addition, after the tape is rolled in, the tape is fully taken up without slack and thus prevented from being damaged.

SUMMARY OF THE INVENTION

It is therefore a primary object of the present invention to provide a video cassette adapter which can be easily operated to draw the tape of a VHS-C video cassette outward to the operation position while keeping the tape properly tensioned. In addition, after retrieved, the tape is fully taken up without slack to avoid tangle and damage of the tape.

According to the above object, the video cassette adapter of the present invention includes: a housing having a front section, a rear section, a first and a second lateral sections, a top wall, a bottom wall and a receptacle for receiving a VHS-C video cassette, the receptacle including a front portion, a rear portion, a first and a second lateral portions, a top opening and a bottom wall, the front portion of the receptacle being communicated with the front section of the housing; a first tape conducting member having one end pivotally disposed between the first lateral section of the housing and the first lateral portion of the receptacle, and an other end provided with a tape conducting roller and shiftable from the front portion of the receptacle to the front section of the housing or from the front section of the housing to the front portion of the receptacle; a second tape conducting member having one end pivotally disposed between the second lateral section of the housing and the second lateral portion of the receptacle, and an other end provided with a tape conducting roller and shiftable from the front portion of the receptacle to the front section of the housing or from the front section of the housing to the front portion of the receptacle; a first gear rotatably disposed in the housing and extended into the first lateral portion of the receptacle to engage with a gear of a tape take-up reel of the video cassette; a tape rolling reel rotatably disposed in the housing between the first lateral section thereof and the first lateral portion of the receptacle, the tape rolling reel being provided with a gear and drivingly engaged with the first gear; an operation button slidably disposed on the top wall of the housing and extended through the top wall into the housing; a driving lever slidably disposed in the housing and having a driving pin slidably operatively connected with the first tape conducting member to drive the same from a non-operation position to an operation position or reversely, the driving lever being connected with the operation button; a transmission mechanism disposed between the second lateral section of the housing and the second lateral portion of the receptacle, one end of the transmission mechanism being slidably connected with the second tape conducting member; a linkage lever slidably disposed between the rear section of the housing and the rear portion of the receptacle, two ends of the linkage lever being pivotally connected with the first tape conducting member and the transmission mechanism respectively; and a spring connected between the housing and the driving lever.

The first tape conducting member further has a guide slot slidably engaged with the driving pin of the driving lever. The guide slot includes: a first segment which is parallel to the travel path of the driving lever when the first tape conducting member is in the non-operation position; a second segment which is not parallel to the travel path of the driving lever no matter where the first tape conducting member is positioned; and a third segment which is parallel to the travel path of the driving lever when the first tape conducting member is in the operation position.

The adapter of the present invention further includes a tape retrieving device including: a rack molded on the driving lever; a second gear rotatably disposed in the housing and engaged with the rack; a third gear rotatably disposed in the housing and coaxial with the second gear; a rotary arm having one end pivotally connected with a central shaft of the third gear; a movable gear rotatably disposed at an other end of the rotary arm and engaged with the third gear, the movable gear being movable along with the rotary arm to engage with or disengage from the gear of the tape rolling reel; and a damper mechanism disposed between the rotary arm and the second gear and between the second gear and the third gear so as to damp the relative rotation therebetween.

The tape retrieving mechanism further includes a stopper arm secured to the rotary arm to be stopped by the driving lever in the operation position so as to prevent the movable gear from engaging with the gear of the tape rolling reel.

The tape retrieving mechanism further includes a spring which is connected between the housing and the driving lever to help in shifting the driving lever from the operation position to the non-operation position.

The damper mechanism includes: an oil reservoir molded in the third gear, a rotary shaft of the rotary arm and a rotary shaft of the second gear being both extended into the oil reservoir; a high viscosity oil filled in the oil reservoir to contact with the third gear and the rotary shafts of the rotary arm and the second gear for creating frictional force against the relative rotation between each two elements; and a spring disposed in the oil reservoir and acting between the third gear, second gear and rotary arm to create frictional force against the relative rotation between each two elements, The adapter of the present invention further includes: a first locking mechanism disposed between the first lateral section of the housing and the first lateral portion of the receptacle, the first locking mechanism including: a first locating notch formed at a first position of the front section of the housing for the tape conducting roller of the first tape conducting member to fit therein; a first locking member via a pivot shaft pivotally disposed in the housing between the first lateral section thereof and the first lateral portion of the receptacle, the first locking member having a first locking section which abuts against one side of the first locating notch in the operation position; a second locking member via a pivot shaft pivotally disposed in the housing and having a second locking section and a driving pin, in the operation position, the second locking section abutting against the first locking member to keep the same in the operation position; a locking slot formed on the driving lever and having an opening through which the driving pin of the second locking member can slide into the locking slot; and a spring connected between the first locking member and the housing.

The transmission mechanism includes: a rotary member via a pivot shaft pivotally disposed in the housing on a corner between the second lateral section and the rear section of the housing, the rotary member being slidably connected with the linkage lever; and a slide lever slidably disposed between the second lateral section of the housing and the second lateral portion of the receptacle, one end of the slide lever being slidably engaged with the rotary member, while an other end of the slide lever being slidably engaged with the second tape conducting member.

The adapter of the present invention further includes a second locking including: a second locating notch formed at a second position of the front section of the housing for the tape conducting roller of the second tape conducting member to fit therein; and a third locking member via a pivot shaft pivotally disposed in the housing and having a third locking section which abuts against one side of the second locating notch in the operation position.

The adapter of the present invention further includes a third locking mechanism including: a locking notch formed on the driving lever; and a fourth locking member via a pivot shaft pivotally disposed between the rear section of the housing and the rear portion of the receptacle, the fourth locking member having a touching section extending into the receptacle and a locking hook capable of hooking the locking notch to prevent the driving lever from being shifted to the operation position when the video cassette is not placed into the receptacle.

The adapter of the present invention further includes a fourth locking mechanism including: a locking section molded in the housing; and a fifth locking member via a pivot shaft pivotally disposed on the driving lever, in the operation position, the fifth locking member abutting against the locking section and retaining the driving lever in the operation position.

The adapter of the present invention further includes a brake mechanism including: a brake member slidably disposed beside the first lateral portion of the receptacle and having a brake section capable of contacting with the gear coaxial with the first gear; and a spring connected between the brake member and the housing to press the brake member against the gear coaxial with the first gear.

The present invention can be best understood through the following description and accompanying drawing, wherein:

DETAILED DESCRIPTION OF THE PREFERRED EMBODIMENT

Please refer to FIGS. 1 to 5. The video cassette adapter 30 of the present invention mainly includes a housing 31, a first tape conducting member 32, a second tape conducting member 33, a first gear 34, a tape rolling reel 35, an operation button 36, a driving lever 37, a transmission mechanism 38, a linkage lever 39, a spring 59 and a top cover 110.

The housing 31 has a front section 40, a rear section 41, a first and a second lateral sections 42, 43, a top wall 44, a bottom wall 45 and a receptacle 46 for receiving a VHS-C video cassette. The receptacle 46 includes a front portion 47, a rear portion 48, a first and a second lateral portions 49, 50, a top opening 51 and a bottom wall 52. The front portion 47 of the receptacle 46 is communicated with the front section 40 of the housing 31.

Figure 1:
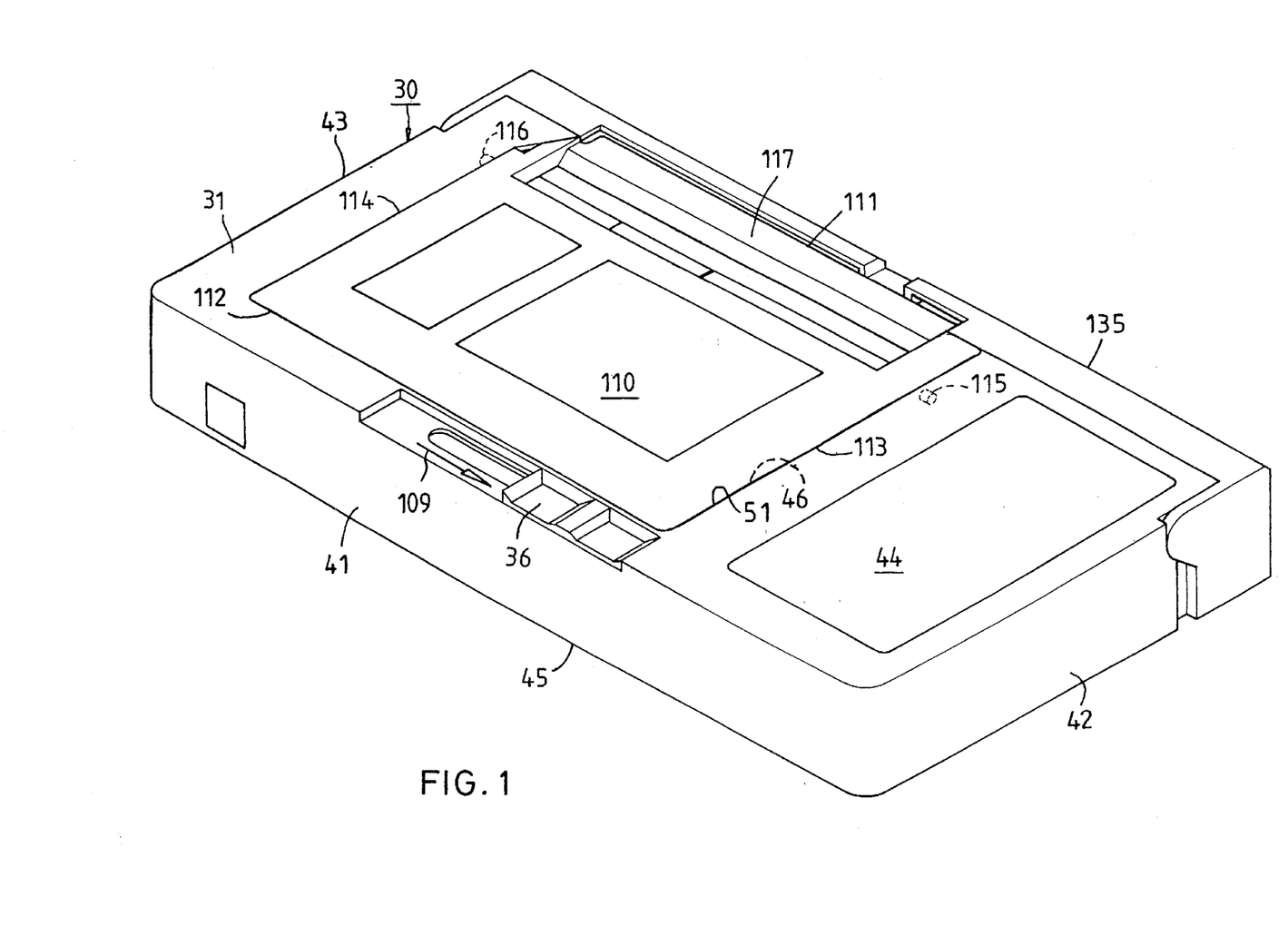
FIG. 1 is a perspective view of the present invention.

The top cover 110 includes a front edge 111, a rear edge 112 and two opposed lateral edges 113, 114 and is provided to cover the top opening 51 of the receptacle 46. Two ends of the front edge of the top cover 110 are respectively disposed with two pivot shafts 115, 116 pivotally connected with the first and second lateral portions 49, 50 of the receptacle 46, whereby the top cover 110 can be pivoted between the top opening 51 and the front portion 47 of the receptacle 46. A throwing section 117 is disposed on the front edge 111 of the top cover 110 such that when the top cover 110 is pivoted open, the throwing section 117 extends into an inner side of a dustproof cover 135 of the VHS-C video cassette, while when the top cover 110 is pivoted to cover the top opening 51 of the receptacle 46, the throwing section 117 throws the dustproof cover 135 from a position at the front portion 47 of the receptacle 46 to a position at the top wall 44 of the housing 31.

Figure 2:
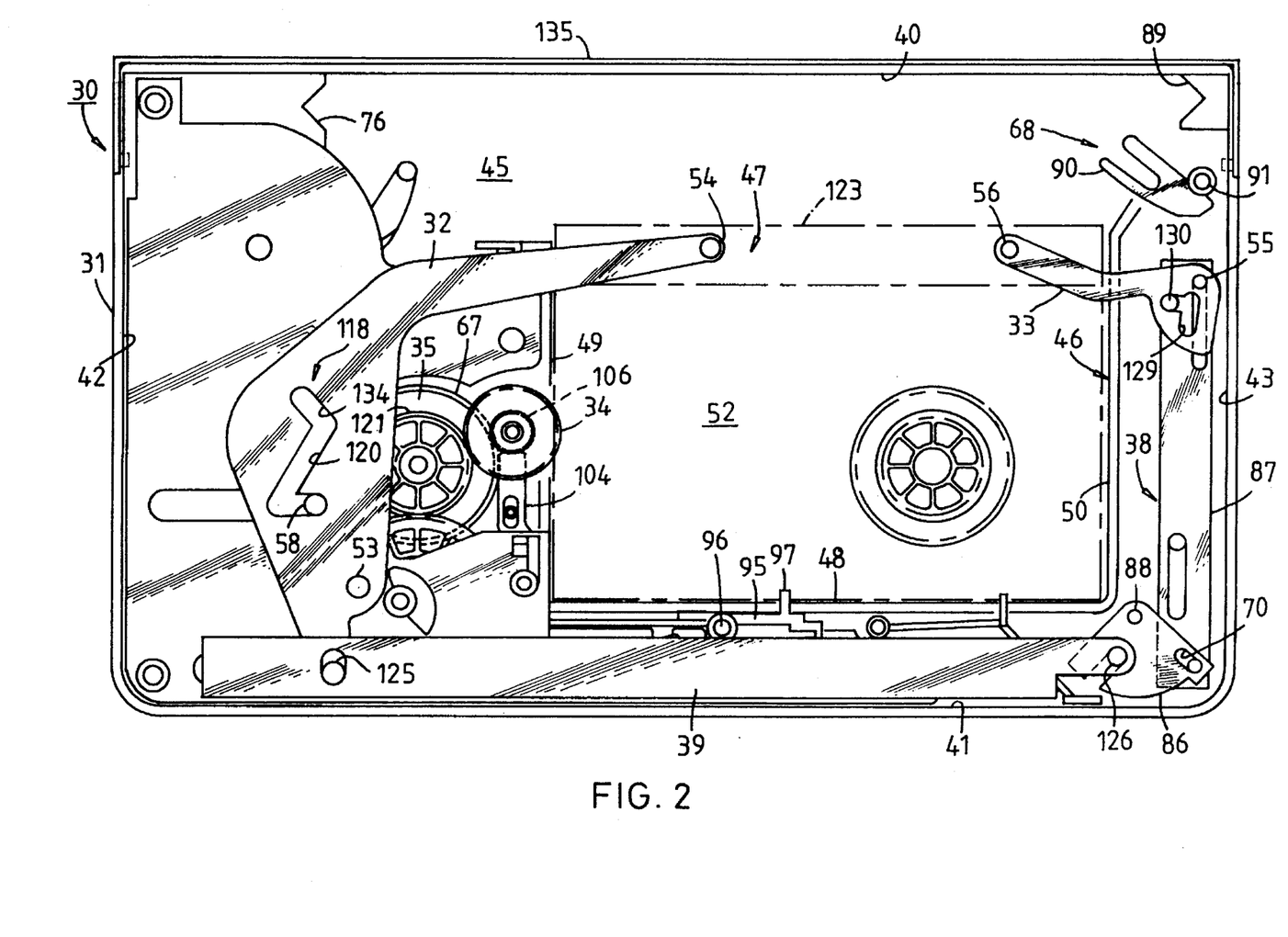
FIG. 2 is a bottom view of the present invention in a non-operation state, wherein the bottom cover is removed.
Figure 3:
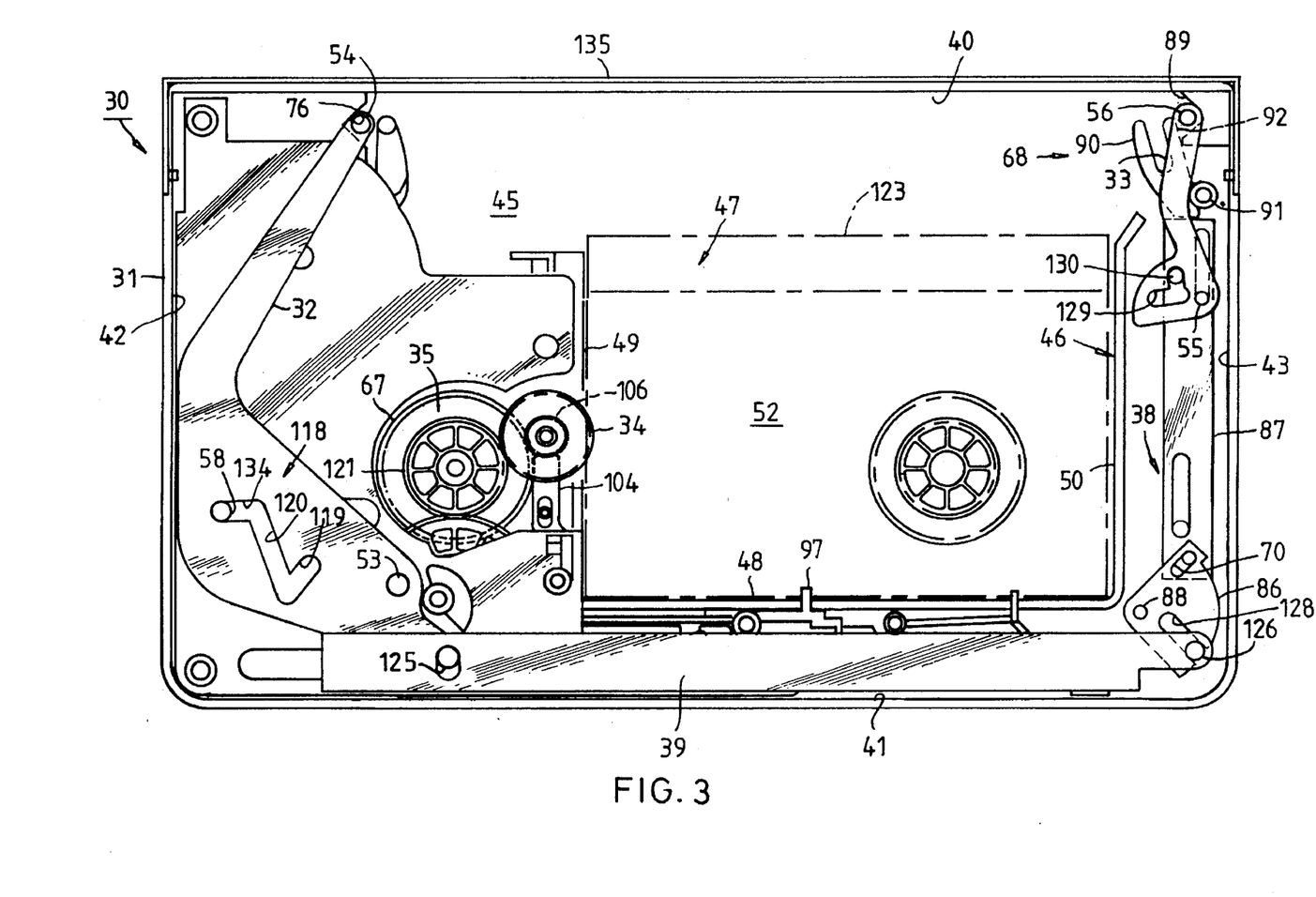
FIG. 3 is a bottom view of the present invention in an operation state, wherein the bottom cover is removed.

One end of the first tape conducting member 32 is pivotally mounted via a pivot shaft 53 between the first lateral section 42 of the housing 31 and the first lateral portion 49 of the receptacle 46. The other end of the first tape conducting member 32 is provided with a tape conducting roller 54 which is shiftable from the front portion 47 of the receptacle 46 to the front section 40 of the housing 31 or from the front section 40 of the housing 31 to the front portion 47 of the receptacle 46.

The first tape conducting member 32 further has a guide slot 118 engaged with a driving pin 58 of the driving lever 37. The guide slot 118 includes a first segment 119, a second segment 120 and a third segment 134. The first segment 119 is parallel to the travel path of the driving lever 37 when the first tape conducting member 32 is in a non-operation position. The second segment 120 is not parallel to the travel path of the driving lever 37 no matter where the first tape conducting member 32 is positioned. While the third segment 134 is parallel to the travel path of the driving lever 37 when the first tape conducting member 32 is in an operation position.

One end of the second tape conducting member 33 is pivotally mounted via a pivot shaft 55 between the second lateral section 43 of the housing 31 and the second lateral portion 50 of the receptacle 46. The other end of the second tape conducting member 33 is provided with a tape conducting roller 56 which is shiftable from the front portion 47 of the receptacle 46 to the front section 40 of the housing 31 or from the front section 40 of the housing 31 to the front portion 47 of the receptacle 46.

The first gear 34 is rotatably disposed in the housing 31 and extended through the first lateral portion 49 of the receptacle 46 to engage with a gear of the tape take-up reel of the video cassette. The tape rolling reel 35 is rotatably disposed in the housing 31 between the first lateral section 42 thereof and the first lateral portion 49 of the receptacle 46. The tape rolling reel 35 is provided with a gear 121 and drivingly engaged with the first gear 34. The operation button 36 is slidably disposed on the top wall 44 of the housing 31 and extended through the top wall 44 into the housing 31. The driving lever 37 is slidably disposed in the housing 31 with the driving pin 58 thereof slidably operatively connected with the first tape conducting member 32 to drive the same from the non-operation position to the operation position or reversely. The driving lever 37 is also connected with the operation button 36. The transmission mechanism 38 is disposed between the second lateral section 43 of the housing 31 and the second lateral portion 50 of the receptacle 46. One end of the transmission mechanism 38 is slidably connected with the second tape conducting member 33. The linkage lever 39 is slidably disposed between the rear section 41 of the housing 31 and the rear portion 48 of the receptacle 46. Two ends of the linkage lever 39 via two pivot shafts 125, 126 are pivotally connected with the first tape conducting member 32 and the transmission mechanism 38 respectively.

Figure 5:
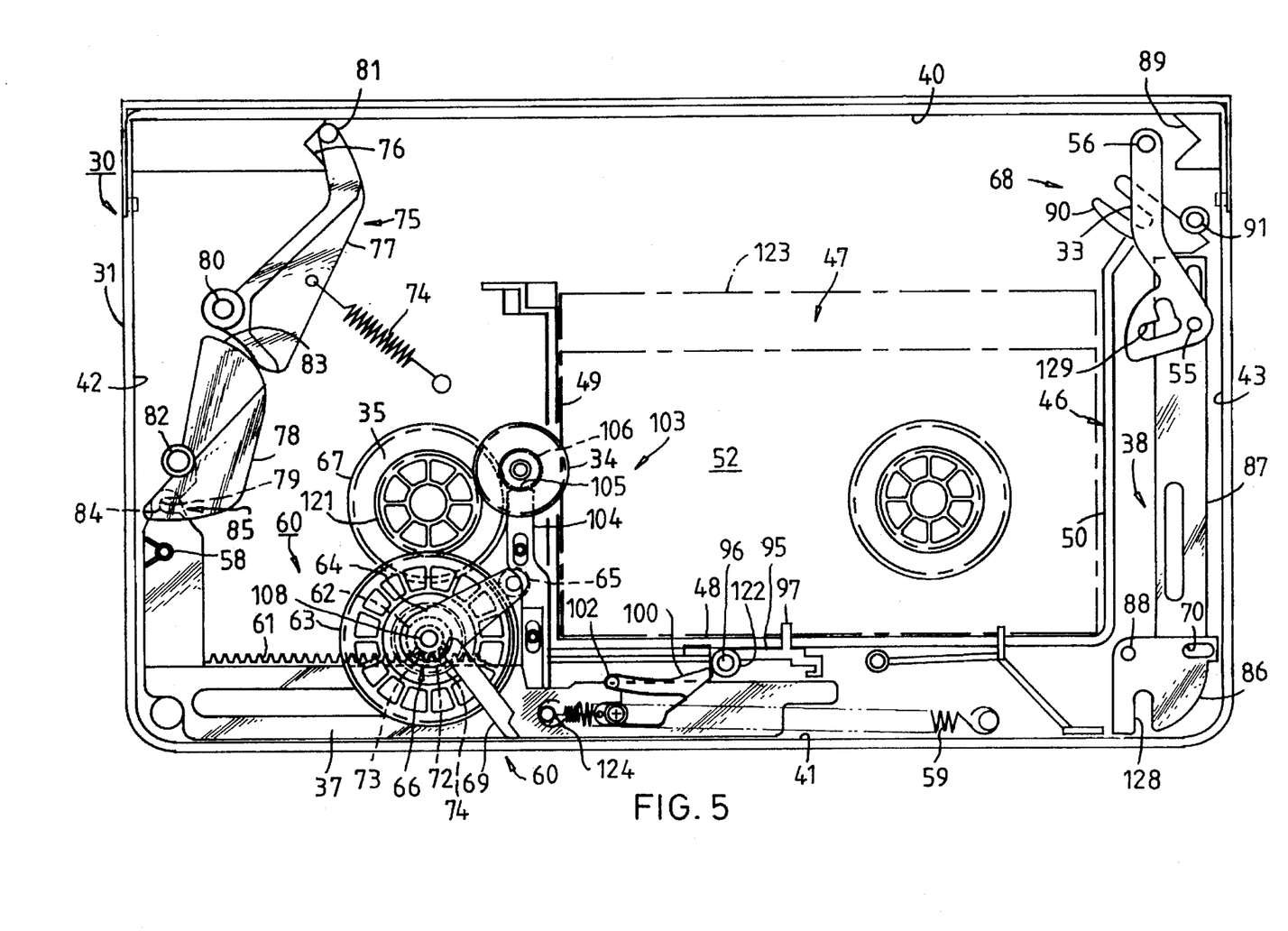
FIG. 5 is a bottom view of the present invention, wherein the bottom cover, linkage lever, first tape conducting member and mounting board are removed.

The adapter further includes a tape retrieving device 60 including a rack 61, a second gear 62, third gear 63, a rotary arm 64, a movable gear 65 and a damper mechanism 66. The rack 61 is molded on the driving lever 37. The second gear 62 is rotatably disposed in the housing 31 and engaged with the rack 61. The third gear 63 is rotatably disposed in the housing 31 and coaxial with the second gear 62. One end of the rotary arm 64 is pivotally connected with a central shaft 108 of the third gear 63, while the movable gear 65 is rotatably disposed at the other end of the rotary arm 64 and engaged with the third gear 63. The movable gear 65 is movable along with the rotary arm to engage with or disengage from the gear 67 of the tape rolling reel 35. The damper mechanism 66 is disposed between the rotary arm 64 and the second gear 62 and between the second gear 62 and the third gear 63 so as to damp the relative rotation therebetween.

The tape retrieving mechanism further includes a stopper arm 69 secured to the rotary arm 64 to be stopped by the driving lever 37 in the operation position so as to prevent the movable gear 65 from engaging with the gear 67 of the tape rolling reel 35. The tape retrieving mechanism 60 further includes the spring 59 which is connected between the housing 31 and the driving lever 37 to help in shifting the driving lever 37 from the operation position to the non-operation position.

The damper mechanism 66 includes an oil reservoir 72 containing high viscosity oil 73 and a spring 74. The oil reservoir 72 is molded in the third gear 63. A rotary shaft of the rotary arm 64 and a rotary shaft of the second gear 62 are both extended into the oil reservoir 72. The high viscosity oil 73 is filled in the oil reservoir 72 to contact with the third gear 63 and the rotary shafts of the rotary arm 64 and the second gear 62 for creating frictional force against the relative rotation between each two elements. The spring 70 is disposed in the oil reservoir 72 and acts between the third gear 63, second gear 62 and rotary arm 64 to create frictional force against the relative rotation between each two elements.

Figure 4:
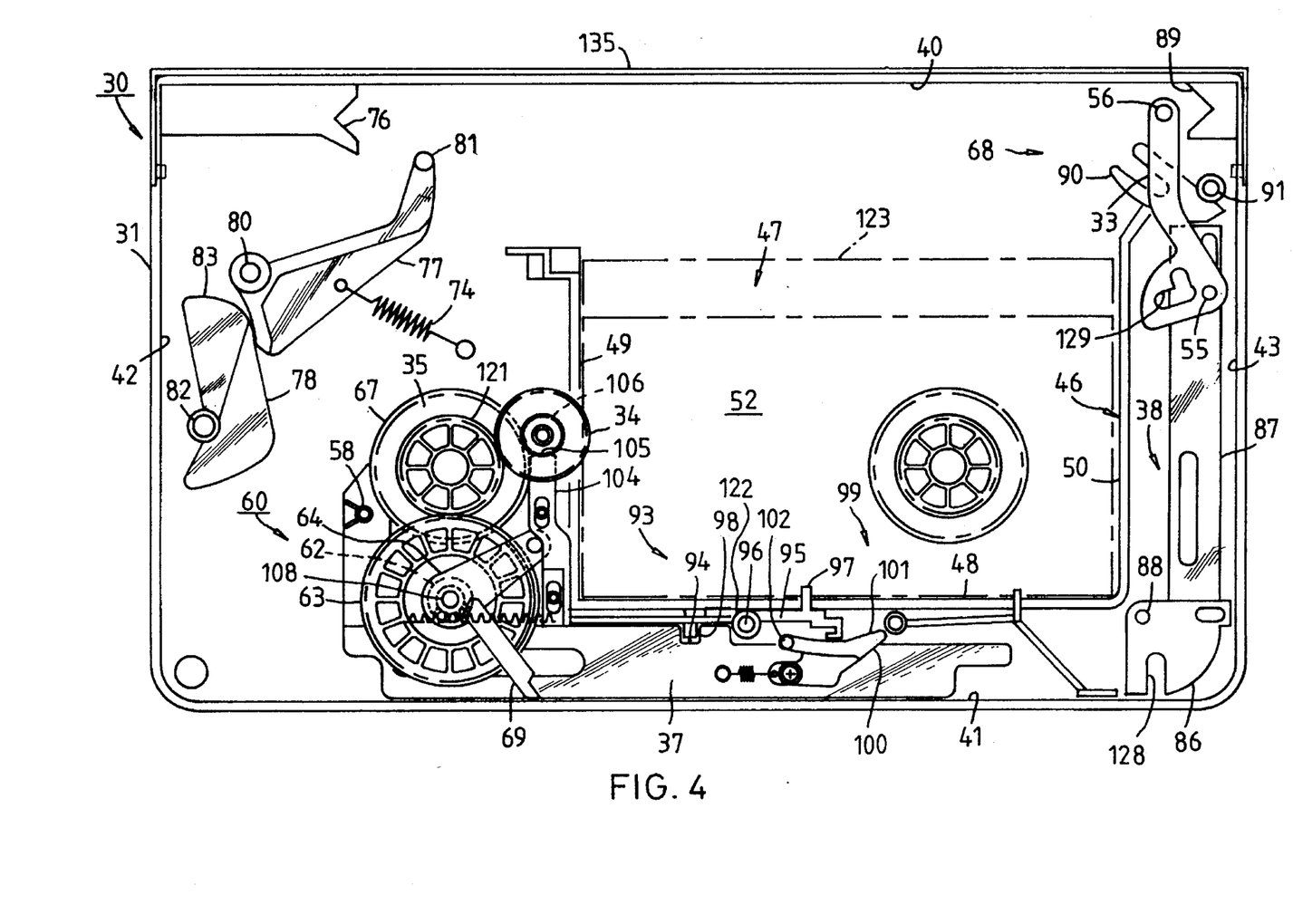
FIG. 4 is a bottom view of the present invention, wherein the bottom cover and the linkage lever are removed.

The adapter further includes a first locking mechanism 75 including a first locating notch 76, a first locking member 77, a second locking member 78 and a locking slot 79. The first locating notch 76 is formed at a first position of the front section 40 of the housing 31 for the tape conducting roller 54 of the first tape conducting member 32 to fit therein. The first locking member 77 via a pivot shaft 80 is pivotally disposed in the housing 31 between the first lateral section 42 thereof and the first lateral portion 49 of the receptacle 46. The first locking member 77 has a first locking section 81 which abuts against one side of the first locating notch 76 in the operation position. The second locking member 78 via a pivot shaft 82 is pivotally disposed in the housing 31, having a second locking section 83 and a driving pin 84. In the operation position, the second locking section 83 abuts against the first locking member 77 to keep the same in the operation position. The locking slot 79 is formed on the driving lever 37, having an opening 85 through which the driving pin 84 of the second locking member 78 can slide into the locking slot 79. The spring 74 is connected between the first locking member 77 and the housing 31.

The transmission mechanism 38 includes a rotary member 86 and a slide lever 87. The rotary member 86 via a pivot shaft 88 is pivotally disposed in the housing 31 on a corner between the second lateral section 43 and the rear section 41 of the housing 31. The rotary member 86 is slidably connected with the linkage lever 39 by means of a slide slot 128. The slide lever 87 is slidably disposed between the second lateral section 43 of the housing 31 and the second lateral portion 50 of the receptacle 46. One end of the slide lever 87 is slidably engaged with a slide slot 70 of the rotary member 86, while the other end of the slide lever 87 is slidably engaged with a pivot shaft 130 of the second tape conducting member 33 via a slide slot 129.

The adapter further includes a second locking mechanism 68 including a second locating notch 89 and a third locking member 90. The second locating notch 89 is formed at a second position of the front section 40 of the housing 31 for the tape conducting roller 56 of the second tape conducting member 33 to fit therein. The third locking member 90 via a pivot shaft 91 is pivotally disposed in the housing, having a third locking section 92 which abuts against one side of the second locating notch 89 in the operation position.

The adapter further includes a third locking mechanism 93 including a locking notch 94 and a fourth locking member 95. The locking notch 94 is formed on the driving lever 37. The fourth locking member 95 via a pivot shaft 96 is pivotally disposed between the rear section 41 of the housing 31 and the rear portion 48 of the receptacle 46. The fourth locking member 95 has a touching section 97 extending into the receptacle 46 and a locking hook 98 capable of hooking the locking notch 94 to prevent the driving lever 37 from being shifted to the operation position when the VHS-C video cassette is not placed in the receptacle 46.

The adapter further includes a fourth locking mechanism 99 including a locking section 100 and a fifth locking member 101. The locking section 100 is molded in the housing 31. The fifth locking member 101 via a pivot shaft 102 is pivotally disposed on the driving lever 37. In the operation position, the fifth locking member 101 abuts against the locking section 100 and retains the driving lever 37 in the operation position.

The adapter further includes a brake mechanism 103 including a brake member 104 and a spring (not shown). The brake member 104 is slidably disposed beside the first lateral portion 49 of the receptacle 46, having a brake section 105 capable of contacting with a gear 106 coaxial with the first gear 34. The spring (not shown) is connected between the brake member 104 and the housing 31 to press the brake member 104 against the gear 106.

In operation, as shown in FIG. 1, the operation button 36 of the adapter 30 is first pushed in a direction of arrow 109. At this time, the top cover 110 is resiliently bounded upward to expose the receptacle 46. Then, the VHS-C video cassette 123 is placed into the receptacle 46 and the top cover 110 is pivoted down to cover the receptacle 46. Following the covering movement of the top cover 110, the dustproof cover 135 of the video cassette is opened by the throwing section 117. Meanwhile, as shown in FIG. 2, the touching section 97 of the fourth locking member 95 is forced out of the receptacle 46 by the video cassette 123 and the fourth locking member 95 is clockwise rotated about the pivot shaft 96 to make the locking hook 98 disengaged from the locking notch 94 of the driving lever 37. Consequently, the operation button 36 can be further pushed in the direction of arrow 109. Reversely, in case the video cassette 123 is not placed in the receptacle 46, the touching section 97 of the fourth locking member 95 will extend into the receptacle 46 to make the locking hook 98 hooked in the locking notch 94 of the driving lever 37 and latch the same. At this time, the operation button 36 cannot be pushed in the direction of arrow 109 so as to avoid mis-operation of the driving lever 37 and the operation button 36 before the video cassette 123 is placed into the receptacle 46.

When drawing the tape of the video cassette 123 in the receptacle 46 outward to the front section 40 of the housing 31, the operation button 36 is further pushed in the direction of arrow 109 to make the driving lever 37 further move in the direction of arrow 109. At this time, the driving pin 58 of the driving lever 37 pushes the first tape conducting member 32 along the guide slot 119 thereof, making the first tape conducting member 32 counterclockwise rotate about the pivot shaft 53.

Before the first tape conducting member 32 starts to rotate, the driving pin 58 first moves through the first segment 119 of the guide slot 118. Since the first segment 119 is parallel to the travel path of the driving lever 37 when the first tape conducting member 32 is in the operation position, the first tape conducting member 32 is not moved yet at this time. However, the rack 61 of the driving lever 37 will drive the second gear 62 to rotate. The second gear 62 thus through the damper mechanism 66 drives the rotary arm 64 to counterclockwise rotate, making the movable gear 65 disposed on the rotary arm 64 move to and engage with the gear 121 of the tape rolling reel 35. Simultaneously, the second gear 62 through the damper mechanism 66 drives the third gear 63 to rotate. The third gear 63 in turn through the movable gear 65 drives the gear 121 of the tape rolling reel 35. The tape rolling reel 35 through the gear 67 drives the pinion 106 of the first gear 34 to make the first gear 34 rotate. The first gear 34 then drives the gear of a tape take-up reel of the video cassette 123 so as to precedingly take up the tape and thus avoid tangling thereof. In case the tape in the video cassette 123 has already been taken up, the damper mechanism 66 will build a relative sliding relationship between the third gear 63 and the second gear 62. This prevents the tape from being torn apart.

Then, when the driving lever 37 further moves in the direction of the arrow 109, the driving pin 58 of the driving lever 37 continuously along the second segment 120 of the guide slot 118 of the first tape conducting member 32 pushes the first tape conducting member 32, making the same start to counterclockwise rotate. Consequently, via the tape conducting roller 54 of the first tape conducting member 32, the tape is drawn out of the video cassette 123 to the first locating notch 76.

In the meanwhile, the first tape conducting member 32 via the pivot shaft 125 pushes the linkage lever 39 to move in the direction of the arrow 109. The linkage lever 39 in turn via the pivot shaft 126 and the slide slot 128 pushes the rotary member 86, making the rotary member 86 counterclockwise rotate. The rotary member 86 in turn via the slide slot 70 pushes the slide lever 87 toward the front section 40 of the housing 31. The slide lever 87 then via the pivot shaft 130 and the slide slot 129 of the second tape conducting member 33 makes the second tape conducting member 33 clockwise rotate about the pivot shaft 133. At this time, by means of the roller 56 of the second tape conducting member 33, the tape is drawn out of the video cassette 123 to the second locating notch 89.

When the driving pin 58 reaches the end of the second segment 120 of the guide slot 118, the first tape conducting member 32 also reaches the end of its travel and leans against the first lateral section 42 of the housing 31 without further rotation. However, the driving pin 58 further goes into the third segment 134 of the guide slot 118 and continuously slides therealong. Since the third segment 134 is parallel to the travel path of the driving lever 37 when the first tape conducting member 32 is in the operation position, the first tape conducting member 32 will not further move. However, the rack 61 of the driving lever 37 still continuously drives the second gear 62, damper mechanism 66, rotary arm 64, movable gear 65, gear 120, gear 67 and pinion 106 coaxial with the tape rolling reel 35 so as to rotate the gear (not shown) of the video cassette 123 and take up the tape to avoid possible tangle of the tape. When the tape is properly taken up, the damper mechanism 66 will render a sliding relationship between the third and second gears 63, 62. Therefore, while being properly taken up, the tape is prevented from being torn apart.

Once the first tape conducting member 32 reaches the end of the travel, the driving pin 58 starts to further slide along the third segment 134 of the guide slot 118. At this time, the driving pin 84 of the driving lever 37 slides into the opening 85 of the locking slot 79 of the second locking member 78 and makes the second locking member 78 clockwise rotate about the pivot shaft 82. Consequently, the second locking member 78 abuts against the first locking member 77 and makes the same counterclockwise about the pivot shaft 80 and lean against the side of the first locating notch 76 with the tape conducting roller 54 of the first tape conducting member 32 fitted in the first locating notch 76.

Meanwhile, the slide lever 87 pushes the third locking member 90 and makes the same clockwise rotate about the pivot shaft 91 to fit the tape conducting roller 56 of the second tape conducting member 33 into the second locating notch 89.

When the tape is completely stretched, the stopper arm 69 secured to the rotary arm 64 is stopped by the post 124 of the driving lever 37 in the operation position to prevent the movable gear 65 from engaging with the gear 67 of the tape rolling reel 35.

During the entire tape stretching operation, the operation button 36, the fifth locking member 101 driven thereby and the driving lever 37 are all pushed in the direction of arrow 109. When the locking section 100 of the fifth locking member 101 is slid to the post 122, the locking section 100 is locked thereby to prevent the driving lever 37 from being pulled back to the non-operation position by the spring 59.

When the tape is retrieved from the front section 40 of the housing 31 to the front portion 47 of the receptacle 46, the operation button 36 is pushed in a direction reverse to that of the arrow 109, making the locking section 100 of the fifth locking member 101 unlocked from the post 122. At this time, the spring 59 pulls the driving lever 37 back to the non-operation position.

When starting to retrieve the tape, the driving lever 37 first takes up the tape through the rack 61 of the tape retrieving device 60, the second and third gears 62, 63, the rotary arm 64, the movable gear 65 and the damper mechanism 66. Meanwhile, the first and second locking mechanisms 75, 68 are released. Then, the driving lever 37 further moves in the direction reverse to that of the arrow 109 with the driving pin 58 continuously pushing the first tape conducting member 32 along the second segment 120 of the guide slot 118 and making the first tape conducting member 32 clockwise rotate back to the front portion 47 of the receptacle 46. Also, through the first tape conducting member 32, the linkage lever 39 and the transmission mechanism 38, the second tape conducting member 33 is in turn pulled back to the front portion 47 of the receptacle 46 as shown in FIG. 2.

After the first and second tape conducting members 32 and 33 are both pulled back to the front portion 47 of the receptacle 46, the driving pin 58 eventually slides along the first segment 119 of the guide slot 118. Since the first segment 119 is parallel to the travel path of the driving lever 37 in this state, the rack 61 of the driving lever 37 will drive the second gear 62, the damper mechanism 66, the rotary arm 64, the movable gear 65, the gear 120 of the tape rolling reel 35, the gear 67, the pinion 106 and the first gear 34 to rotate the gear of the video cassette 123 for taking up the tape and avoiding possible tangle of the tape.

During the tape stretching and retrieving operation, the brake member 104 is urged by the spring to contact with the pinion 106 of the first gear 34 so as to create a braking effect and avoid slack of the tape.

It is to be understood that the above description and drawings are only used for illustrating one embodiment of the present invention, not intended to limit the scope thereof. Any variation and derivation from the above description and drawings should be included in the scope of the present invention.

What is claimed is:

1. A video cassette adapter comprising:

a housing having a front section, a rear section, first and second lateral sections, a top wall, a bottom wall and a receptacle for receiving a VHS-C video cassette, the receptacle including a front portion, a rear portion, first and second lateral portions, a top opening and a bottom wall, the front portion of the receptacle being communicated with the front section of the housing;

a first tape conducting member having one end pivotally disposed between the first lateral section of the housing and the first lateral portion of the receptacle, and an other end provided with a tape conducting roller and shiftable from the front portion of the receptacle to the front section of the housing or from the front section of the housing to the front portion of the receptacle;

a second tape conducting member having one end pivotally disposed between the second lateral section of the housing and the second lateral portion of the receptacle, and an other end provided with a tape conducting roller and shiftable from the front portion of the receptacle to the front section of the housing or from the front section of the housing to the front portion of the receptacle;

a first gear rotatably disposed in the housing and extended through the first lateral portion of the receptacle to engage with a gear of a tape take-up reel of the video cassette;

a tape rolling reel rotatably disposed in the housing between the first lateral section thereof and the first lateral portion of the receptacle, the tape rolling reel being provided with a gear and drivingly engaged with the first gear;

an operation button slidably disposed on the top wall of the housing and extended through the top wall into the housing;

a driving lever slidably disposed in the housing and having a driving pin slidably operatively connected with the first tape conducting member to drive the same reversibly between a non-operation position to an operation position, the driving lever being connected with the operation button;

a transmission mechanism disposed between the second lateral section of the housing and the second lateral portion of the receptacle, one end of the transmission mechanism being slidably connected with the second tape conducting member;

a linkage lever slidable disposed between the rear section of the housing and the rear portion of the receptacle, two ends of the linkage lever being pivotally connected with the first tape conducting member and the transmission mechanism respectively; and a spring connected between the housing and the driving lever.

2. A video cassette adapter as claimed in claim 1, wherein the first tape conducting member further has a guide slot slidably engaged with the driving pin of the driving lever, the guide slot including: a first segment which is parallel to the travel path of the driving lever when the first tape conducting member is in the non-operation position; a second segment which is not parallel to the travel path of the driving lever no matter where the first tape conducting member is positioned; and a third segment which is parallel to the travel path of the driving lever when the first tape conducting member is in the operation position.

3. A video cassette adapter as claimed in claim 1, further comprising a tape retrieving device including: a rack molded on the driving lever; a second gear rotatably disposed in the housing and engaged with the rack; a third gear rotatably disposed in the housing and coaxial with the second gear; a rotary arm having one end pivotally connected with a central shaft of the third gear; a movable gear rotatably disposed at an other end of the rotary arm and engaged with the third gear, the movable gear being movable along with the rotary arm to engage with or disengage from the gear of the tape rolling reel; and a damper mechanism disposed between the rotary arm and the second gear and between the second gear and the third gear so as to damp the relative rotation therebetween.

4. A video cassette adapter as claimed in claim 3, wherein the tape retrieving device further includes a stopper arm secured to the rotary arm to be stopped by the driving lever in the operation position so as to prevent the movable gear from engaging with the gear of the tape rolling reel.

5. A video cassette adapter as claimed in claim 3, wherein the damper mechanism includes: an oil reservoir molded in the third gear, a rotary shaft of the rotary arm and a rotary shaft of the second gear being both extended into the oil reservoir; a high viscosity oil filled in the oil reservoir to contact with the third gear and the rotary shafts of the rotary arm and the second gear for creating frictional force against the relative rotation between each two elements; and a spring disposed in the oil reservoir and acting between the third gear, second gear and rotary arm to create frictional force against the relative rotation between each two elements.

6. A video cassette adapter as claimed in claim 1, further comprising a first locking mechanism disposed between the first lateral section of the housing and the first lateral portion of the receptacle, the first locking mechanism including:

a first locating notch formed at a first position of the front section of the housing for the tape conducting roller of the first tape conducting member to fit therein;

a first locking member via a pivot shaft pivotally disposed in the housing between the first lateral section thereof and the first lateral portion of the receptacle, the first locking member having a first locking section which abuts against one side of the first locating notch in the operation position;

a second locking member via a pivot shaft pivotally disposed in the housing and having a second locking section and a driving pin, in the operation position, the second locking section abutting against the first locking member to keep the same in the operation position;

a locking slot formed on the driving lever and having an opening through which the driving pin of the second locking member can slide into the locking slot; and a spring connected between the first locking member and the housing.

7. A video cassette adapter as claimed in claim 1, wherein the transmission mechanism includes:

a rotary member via a pivot shaft pivotally disposed in the housing on a corner between the second lateral section and the rear section of the housing, the rotary member being slidably connected with the linkage lever; and a slide lever slidably disposed between the second lateral section of the housing and the second lateral portion of the receptacle, one end of the slide lever being slidably engaged with the rotary member, while an other end of the slide lever being slidably engaged with the second tape conducting member.

8. A video cassette adapter as claimed in claim 1, further comprising a second locking mechanism including:

a second locating notch formed at a second position of the front section of the housing for the tape conducting roller of the second tape conducting member to fit therein; and a third locking member via a pivot shaft pivotally disposed in the housing and having a third locking section which abuts against one side of the second locating notch in the operation position.

9. A video cassette adapter as claimed in claim 1, further comprising a third locking mechanism including:

a locking notch formed on the driving lever; and a fourth locking member via a pivot shaft pivotally disposed between the rear section of the housing and the rear portion of the receptacle, the fourth locking member having a touching section extending into the receptacle and a locking hook capable of hooking the locking notch to prevent the driving lever from being shifted to the operation position when the video cassette is not placed into the receptacle.

10. A video cassette adapter as claimed in claim 1, further comprising a fourth locking mechanism including:

a locking section molded in the housing; and a fifth locking member via a pivot shaft pivotally disposed on the driving lever, in the operation position, the fifth locking member abutting against the locking section and retaining the driving lever in the operation position.

11. A video cassette adapter as claimed in claim 1, further comprising a brake mechanism including: a brake member slidably disposed beside the first lateral portion of the receptacle and having a brake section capable of contacting with a gear disposed in coaxial relationship with the first gear.

* * * * *